United States Patent [19]

Spangler et al.

[11] Patent Number: 5,015,212

[45] Date of Patent: May 14, 1991

[54] SYSTEM FOR ASSESSING BEE TEMPERAMENT

[75] Inventors: Hayward G. Spangler; Eric H. Erickson, both of Tucson, Ariz.

[73] Assignee: The United States of America as represented by the Secretary of Agriculture, Washington, D.C.

[21] Appl. No.: 514,479

[22] Filed: Apr. 25, 1990

[51] Int. Cl.⁵ .............................................. A01K 57/00
[52] U.S. Cl. ........................................... 449/2; 449/47
[58] Field of Search .................................. 449/1, 2, 47

[56] References Cited

U.S. PATENT DOCUMENTS 2,806,082  9/1957  Woods ............................ 449/61 X
4,254,519  3/1981  Vick et al. ......................... 449/47
4,739,531  4/1988  Robson ............................. 449/47

FOREIGN PATENT DOCUMENTS 2095998  10/1982  United Kingdom .................... 449/2

Primary Examiner—Robert P. Swiatek
Attorney, Agent, or Firm—M. Howard Silverstein; John D. Fado

[57] ABSTRACT

The temperament of a bee colony is assessed by placing a transducer-containing target adjacent the colony's hive, and inducing the colony to strike the target. Each individual bee strike is converted into an electrical signal by the target's transducer, that is transmitted to a tape recorder, or a totalizing counter for an immediate readout of the intensity of the strike by the colony.

14 Claims, 6 Drawing Sheets

SYSTEM FOR ASSESSING BEE TEMPERAMENT

FIELD OF INVENTION

This invention relates to assessing the temperament of a colony of bees.

PRIOR ART

Honey bees of the species *Apis melliferal* L. exhibit varying levels of stinging behavior. They may be gentle (uninclined to sting without substantial provocation), moderately defensive (sting readily when disturbed) or highly defensive (sting readily and in great numbers with little or no apparent provocation). So-called "Africanized" honey bees often are highly defensive.

A black leather disc or ball suspended from a string adjacent a hive previously has been employed to detect stinging behavior by counting the number of stingers embedded in the disc after a predetermined interval.

SUMMARY OF INVENTION

We have developed a new system for determining the stinging behavior of bees. Broadly the invention comprises a bee target adjacent a bee colony habitat; wherein the target includes transducer means that is able to detect individual attempts (i.e., strikes) by bees to sting the target, and to convert each such attempt into an electrical signal; and electrical signal receiving means operatively associated with the target to individually convert each of the signals into a form that expresses the number of strikes or attempted stings for a predetermined time interval.

Therefore, it is an object of the present invention to quantify the level of hostility in bees based upon the number of times the bees strike a target (attempting to sting), while attacking it over a defined interval.

Another object is to provide a sting detection system that enables a curator or other person to determine what action, if any should be taken against a hive, such as destroying or requeening it with a queen whose offspring will be more gentle.

A further object is to determine if a colony is gentle, moderately defensive or highly defensive.

Yet a further object is to make possible the elimination of dangerous feral colonies from areas frequented by persons or livestock.

Still another object it to allow inspectors to examine domestic colonies near roads and populated areas and determine if the bees pose an excessive danger.

Still a further object is to sort and categorize the stinging behavior of Africanized honey bees.

Still another object is to permit instantaneous detailed analysis of honey bee stinging attacks, and make possible behavioral analysis and new approaches to dealing with such bees.

An even still further object is to provide a device that may be employed to test the effects of chemicals on reducing bee attack.

Still further, an object is to determine how far, from an apiary. bees will pursue and sting.

Yet another object is to compare striking rates from one bee colony to another.

Even yet further, an object is provide a method and apparatus that judges the temper of honey bee colonies in a consistent and objective manner.

Still a further object is to ascertain the presence of gentle bees as opposed to hostile bees, so that gentle bees may be spared from destruction, and further nurtured.

An even still further object is to provide a device capable of delivering sharpe, clear signals in response to attempted bee strikes.

Other objects and advantages will be obvious from the following more detailed description of the invention taken in conjuction with the drawings in which:

FIG. 1 generally illustrates the present invention;

FIG. 5 is a schematic block diagram of one embodiment of the invention; and

DETAILED DESCRIPTION

Figure 1:
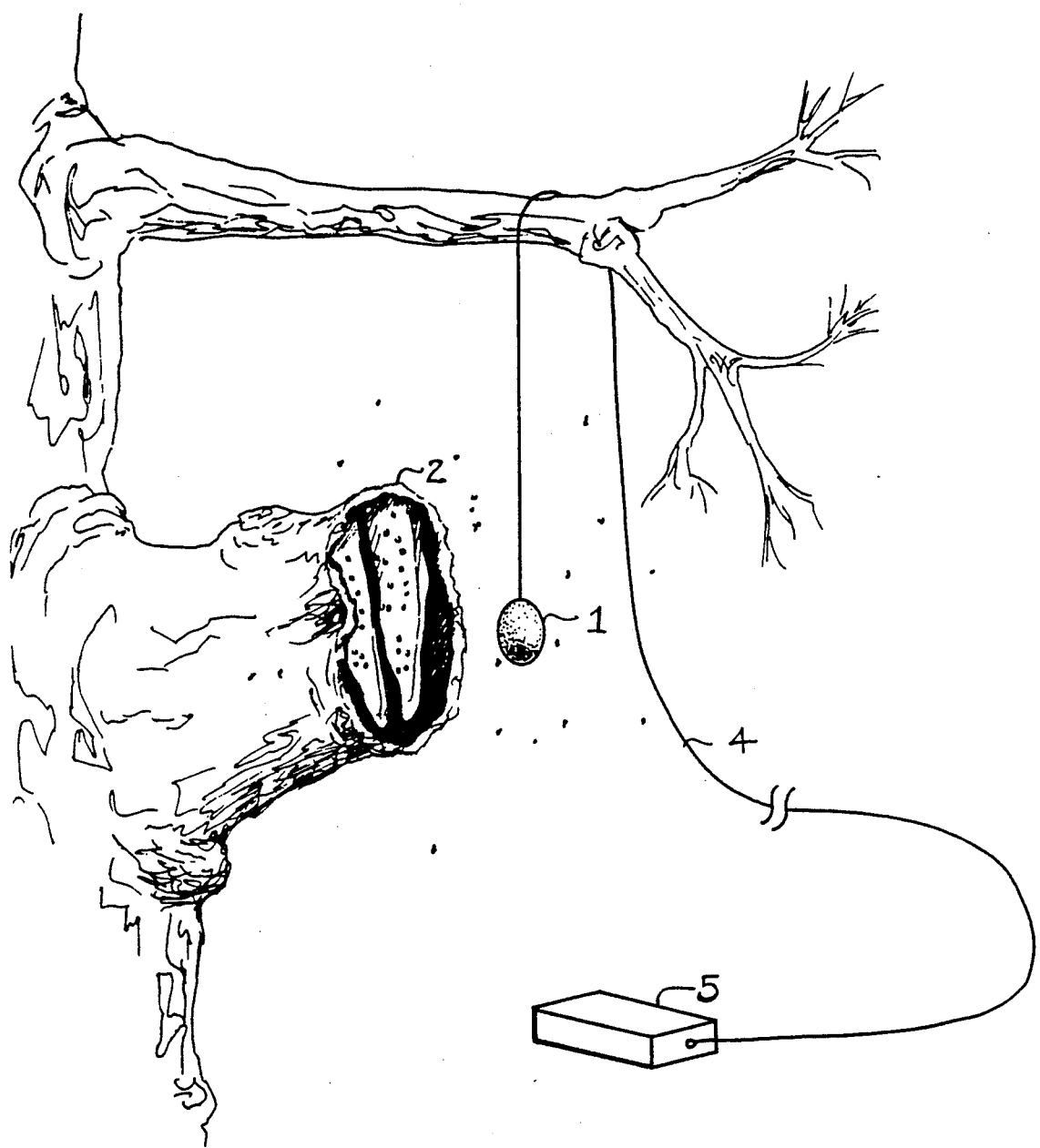
FIG. 1a illustrates the present invention in combination with an apiary bee hive.
Figure 1A:
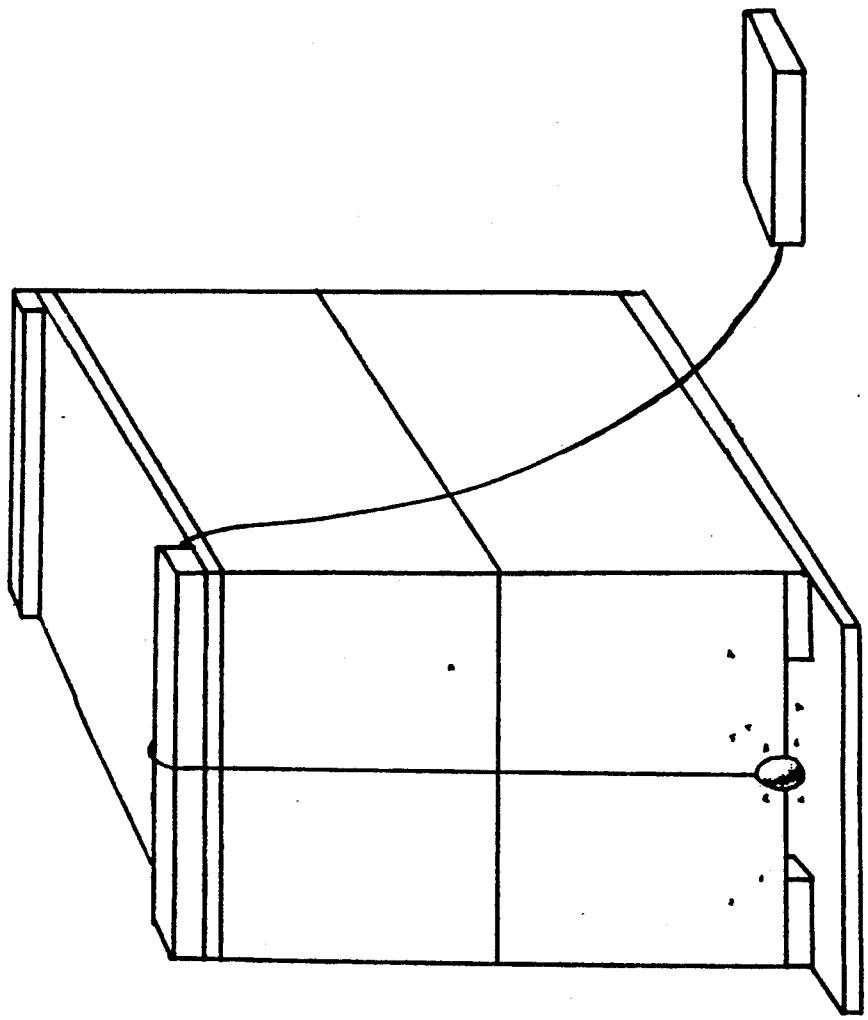

Referring to FIG. 1, a bee target 1 is provided adjacent a feral hive 2. The target essentially consists of two components: (a) a solid outer shell or layer of a shape and/or color that attracts bees, and (b) an inner transducer that detects each attempt by a bee to sting the outer shell or layer, and converts each attempt into an electrical signal or impulse. In addition to feral hives, the target may be positioned adjacent other colony habitats such as apiary hives (FIG. 1a), or hives found in the ground. The target preferably is located at least 75-200 mm in front of the hive's entrance.

One end of a wire cable 4 holds the target in a suspended position adjacent the hive's opening. The opposite end of cable 4 is connected to an electrical signal receiving means 5, which may be located adjacent to or remote from the hive. In the case of an apiary hive, receiving means 5 may be held on top of the hive by means of a weight. Rather than a direct wire connection to receiver 5, target 1 may include radio transmitter means that converts each signal from the target's transducer into a radio transmission, whereby receiver 5 may include a radio receiver, whereby support wire 4 for target 1 simply may constitute a string.

The colony may be induced to attempt to sting target 1 by jarring the hive with a sharp blow, by puffing breath though a tube extending through the hive entrance, or by chemical stimulus known to those skilled in the art.

Jarring can be provided by striking the hive with a hand-held device such as a board, branch, or rock. Remote induction may be accomplished by launching a missile at the hive such as a stone or steel ball bearing thrown by hand or shot from a sling shot. If breath puffing is employed, a 1-2 cm diameter tube is suitable in most instance, and can be of any length out to practical limits of carrying and deploying effectively, and can be made of many materials including paper formed into a roll. Chemicals for stimulating attack should be highly volatile and/or formed into a mist or spray, then injected through the hive entrance. Testing preferably is carried out when the weather is warm enough, and there is sufficient daylight for bees to fly.

Transducers that are able to convert sound, pressure, or vibration into an electrical signal generally are suitable for the purposes of the present invention. This would include microphones and vibration detectors using sensors of the types of piezoelectric, electromagnetic, variable resistance, capacitance, and so forth. Non-resonant transducers may be employed in the practice of the present invention, but, to date, such transducers have not been as successful as resonant transducers in providing a system having good noise rejection characteristics.

Receiver 5 simply may consist of a tape recorder, or it may consist of a counter/time electronic module in which the signal from target 1 is amplified, detected, and registered on an electronic totalizing counter during a set interval. As will be obvious to those skilled in the art, the circuitry for a totalizing counter will vary depending upon the specific transducer. For example, electromagnetic transducers generally require greater amplification than other transducers.

Results are determined by the number of bee strikes over a brief time interval, obtained from a totalizing module or from subsequent analysis of recorded signals such as by a sound spectrum analyzer or a digital oscilloscope. The number of hits per time interval becomes the data by which the temper of the colony is judged.

It should be understood that the device of the present invention gives a comparative estimate of the temper of bees and not an estimate of the number of stings that a soft object such as an animal or a piece of leather might receive, because the bees cannot successfully sting the targets of the present invention, and generally do not land on them. Rather, the bees tend to fly around the target, and a single bee might strike the target more than once. On the other hand, in the case of softer objects, stingers that are imbedded into the target and torn from the bees release an airborne chemical (pheromone) that may stimulate other bees to sting, whereas the present device prevents error caused by sting pheromone because stingers are not left in the target.

Preferably the target is black in color because bees are known to sting dark or black objects more readily then light objects. In addition, it preferably is light weight and easily placed in front of a hive entrance. This is best accomplished by dangling it at the end of a string or a cable. Still further, the target preferably is spherical or cylindrical so that it present the same size target to bees leaving the hive as it fortuitously revolves around its vertical axis while dangling from a string, wire or cable. Other shapes may bias the data by presenting a target that varies in apparent size to the attacking bees.

Yet further, target 1 preferably is constructed to generate a characteristic electrical response by its internal transducer each time a bee attempts to sting the target. One effective way to accomplish this is to build a primary resonance frequency into the apparatus, whereby, when the target is struck, it rings briefly, producing a short electrical signal of one particular frequency. Associated electronic circuitry thus is constructed to recognize only that particular frequency, and to filter out other airborne sounds such as human speech, wingbeats, of flying bees, bird song, and so forth.

Figure 2:
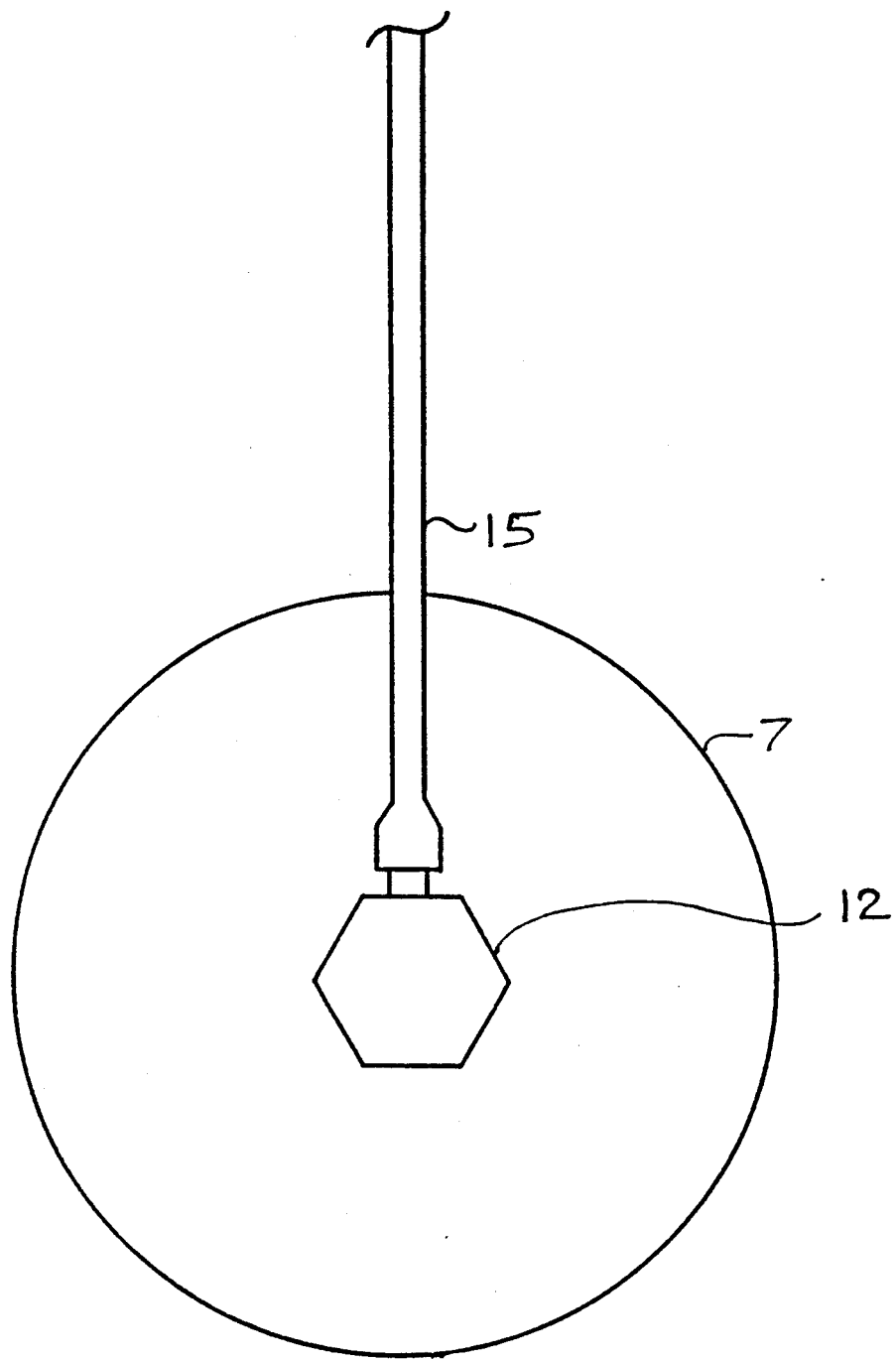
FIGS. 2-4 illustrate embodiments of the target of FIG. 1.

An exemplary embodiment of target 1 is illustrated in FIG. 2. Referring thereto, the target comprises a foamed polystyrene ball 7, typically about three inches (75mm) in diameter, painted black, including a vibration detector (piezoelectric accelerometer) 12 inserted into a hole in the ball. The supporting wire cable 15 may be connected to the accelerometer in a conventional manner, such as by a microdot connector. The accelerometer may be designed to produce a short 1.5 kHz (1500 cycles per second)) tone as a signal each time the ball is struck.

Figure 3:
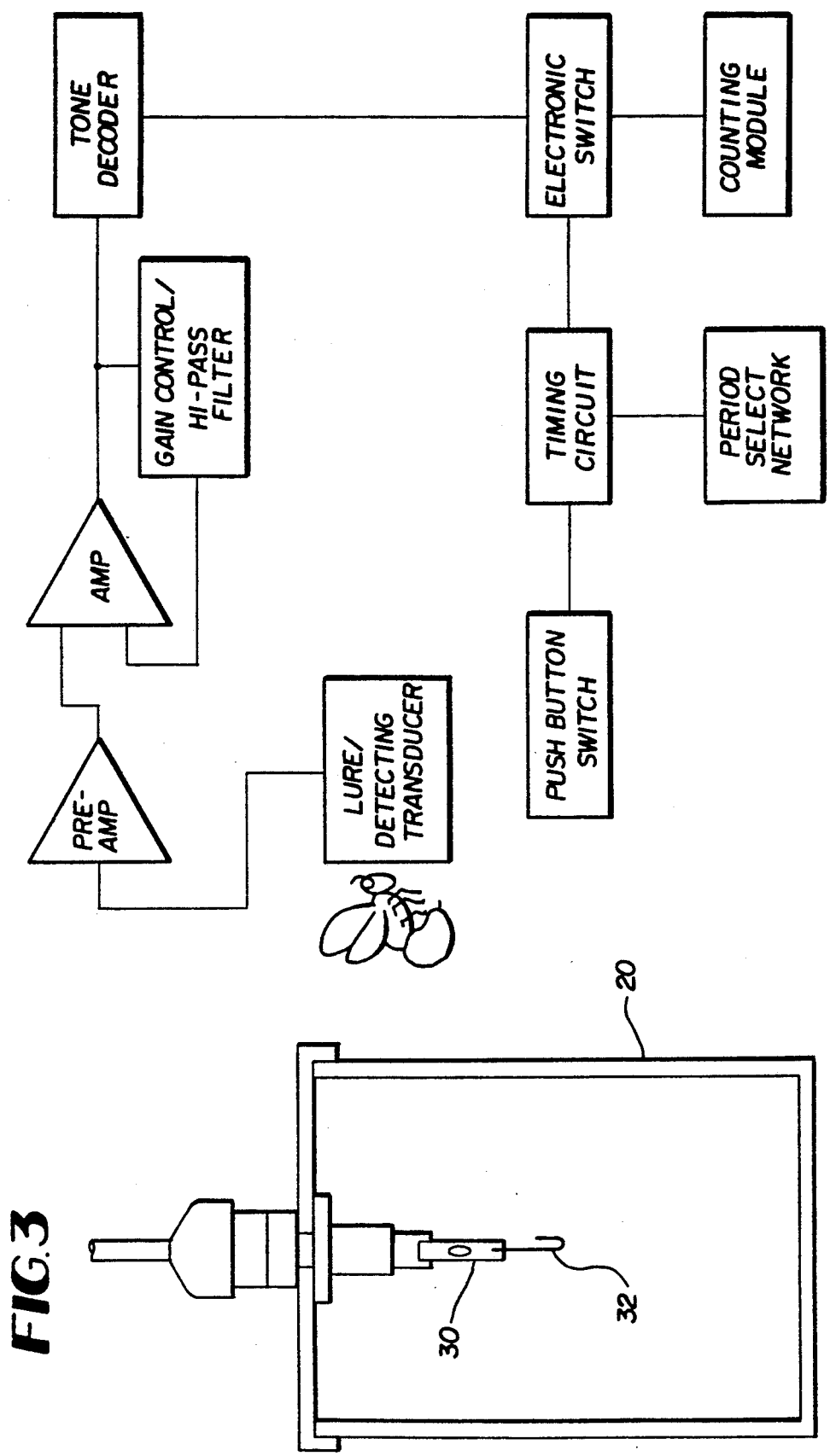

In another embodiment, as shown in FIG. 3, the target is a black cylindrical container 20, about 50 mm high, 42 mm in diameter, constructed of polyolefin. The supporting electric cable 25 may have a phone plug which plugs into a phone jack attached to the top of the container. This embodiment employs an inertially loaded resonance transducer 30 such as an Endevco "Pixie" transducer. These small devices make use of a semiconductor element mounted to a beam. The semiconductor portion changer in resistance when the beam is flexed. While the connector end of the beam is attached solidly to the container lid, its distal end is attached to a special weight 32. The amount and shape of the weight is adjusted to give a signal at the desired frequency when the container is struck by a stinging bee. An exemplary resonance for this device may be 620 Hz.

Figure 4:
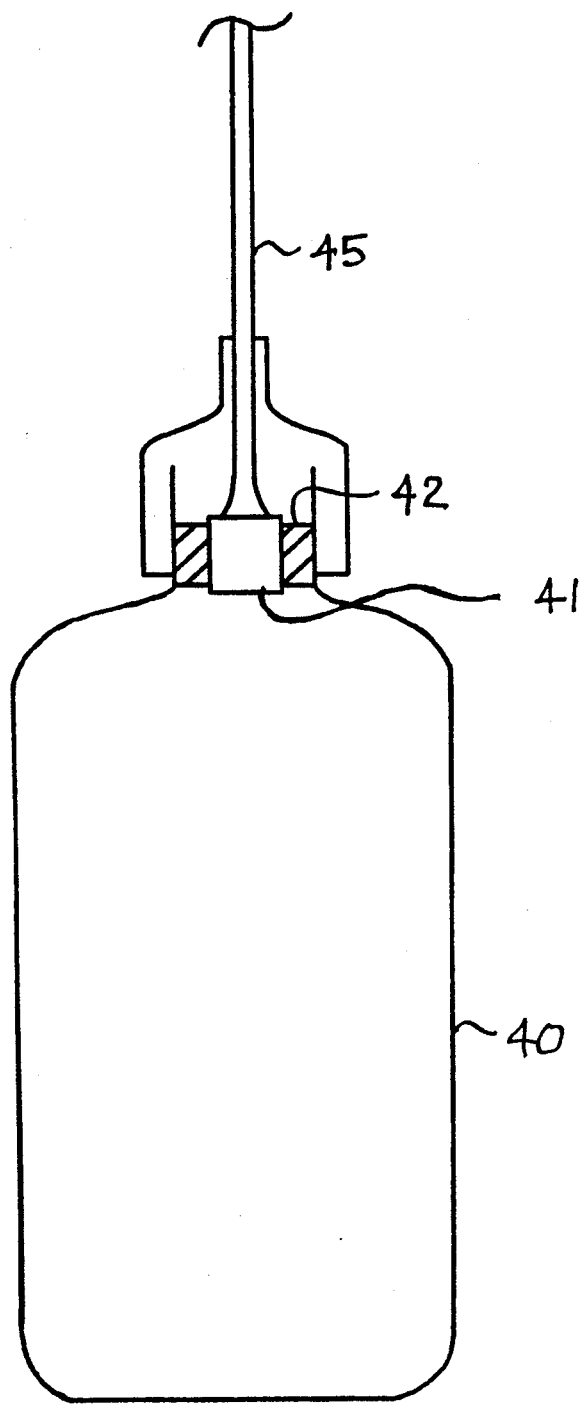

Referring now to a third embodiment of the target in FIG. 4, therein it comprises a 100 ml block polyolefin bottle 40, about 120 mm in height, 40 mm diameter, that has been found to produce a short, 2 kHz tone inside thereof when "stung" by an attacking bee. A small electret capacitance mircrophone 41, such as Radio Shack catoloque no. 270-090, is mounted in foam rubber 42 in the neck of the bottle, with the microphone diaphragm facing down into the empty cavity of the bottle. An electrical cable 45 is connected to the microphone, and extends through the screw-on cap of the bottle. This latter embodiment is inexpensive and rugged, and exhibits consistency from one unit to the next when produced in substantial numbers.

If the device of the present invention is employed in experiments to test chemicals that may reduce or eliminate bee attack, the target obviously may become contaminated, and therefore should not be re-used without thorough washing.

In the preferred practice of the present invention, a counter/timer circuit is employed as the receiver means of FIG. 1, as schematically illustrated in FIG. 5. This provides an immediate read-out of stinging intensity, and thereby provides for field analysis of data, thus eliminating the need to record and perform time consuming analysis in the laboratory. However, in some cases, it may be appropriate to combine a recorder with the counter/timer for purposes of later verification of results.

Figure 6:
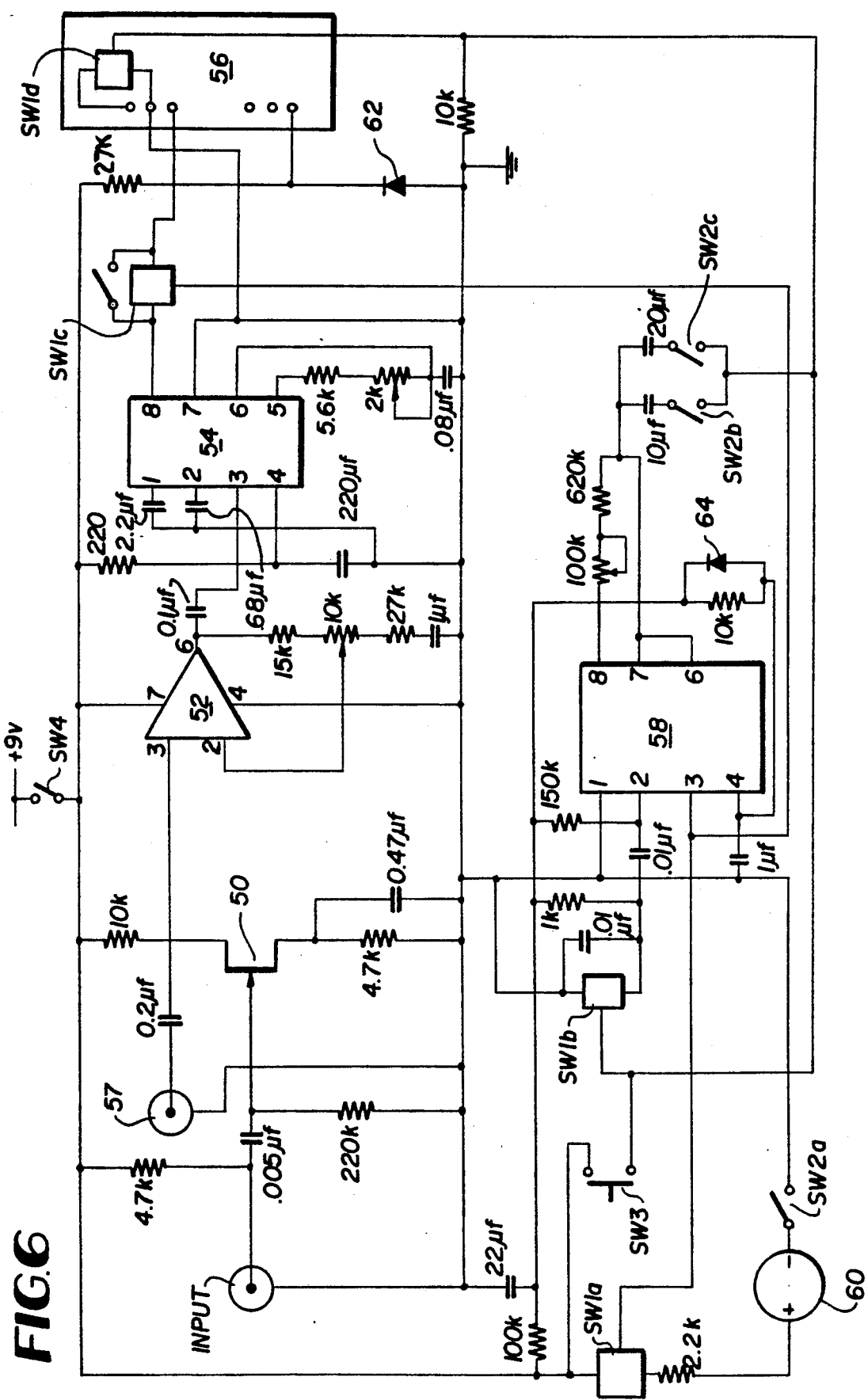
FIG. 6 is a detailed circuit diagram of the embodiment of FIG. 5.

FIG. 6 illustrates exemplary circuitry for the system of FIG. 5. Referring thereto, a 9 volt power source drives the components in the circuitry in the figure. This same power source also applies power across a resistor to the target's transducer (through "input") in the case of a microphone or Pixie transducer, whereas a piezoelectric transducer does not require same.

In operation, the signal from the bee target 1 is amplified first by a low noise field effect transistor 50, FET, such as an MPF 102, then by an operational amplifier 52, such as CA 3140 (RCA). (A 0.005 microfarad capacitor in the "input" circuit block the 9 volts from reaching the gate of the FET, whereby a number of targets may be plugged into the system, without need of a separate battery for each target.) Together the amplifiers have a theoretical gain factor adjustable from 15 x to 9250 x. They also serve as high-pass filters to help reject low frequency noise. The amplified signal is directed to the input of a tone decoder 54, such as an LM 567 (National Semiconductor). If the frequency is recognized, the decoder saturates a transistor which pulls the input of the totalizing module 56 (e.g., a Syrolec 108) to ground and adds one.

Reference number 57 designates a recorder output jack to connect a cable that carries the signal from the target transducer, after some amplification, to an optional recorder (not shown).

On the way to the totalizing module, the signal from decoder 54 passes through an electronic switch, SW 1c, that is controlled by an integrated circuit 58, such as a TLC 555 which is a low power drain CMOS timer integrated circuit by Texas Instrument, which will keep the switch closed for 10, 20, or 30 seconds. Then the switch opens and the module no longer counts, but retains the total so that a record of it can be made. Integrated circuit 58 also controls a buzzer 60 which signals accoustically to let the operator know that counting is taking place.

A mechanical push-button switch, SW 3, closes one electronic switch, SW 1d, to reset the totalizing module to zero while it closes a second switch, SW 1b, to start the timing cycle. In addition to the on-off switch, SW 4, a four-pole DIP (dual inline package) switch, SW 2a–d, allows control over several functions. The timing cycle can be set for 10, 20, or 30 seconds. The buzzer can be switched off and the timing cycle can be defeated so that the totalizing module counts continuously.

Switches, SW 1a–d, are part of a 4066 CMOS logic integrated circuit that functions as a quad bilateral switch. When the positive supply voltage is applied to each control pin, transistor action closes a connection between two other pins. All four sections are used in the counter timer. These switches start the timer, connect the output from tone decoder 54 to the totalizing counter 56, reset the totalizing counter, and turn on the buzzer 60. Other components in the overall circuitry include a Zener diode 62 that limits voltage, in this case to 3 volts; and a general purpose silicide diode 64 that drains off any positive charge on pin 1 of integrated circuit 58.

Exemplary data obtained by the present invention is shown in the following table, in which a colony in an apiary hive was stimulated to strike the target of FIG. 2 by jarring the hive.

| BEE HITS AT INCREASING DISTANCE FROM HIVE | |
| --- | --- |
| Target Location | Number of hits/7.56 seconds |
| At hive | 180 |
| 100 feet away | 160 |
| 200 feet away | 128 |
| 900 feet away | 65 |

Presently constructed embodiments are able to handle about 40 hits or strikes per second if evenly spaced. The maximum number typically is substantially less than 20 hits per second. There may be moments when two striking bess overlap enough to count only once.

We claim:

1. Apparatus for determining stinging behavior of a colony of bees in a bee habitat comprising
    a. bee target means that may be placed adjacent said habitat, wherein said target means includes means to generate a single electrical signal in response to each attempt by a bee to sting said target means; and
    b. electrical signal receiving means operatively associated with said target means to individually convert each such signal into a form that expresses the total number of stings for a predetermined period.

2. The apparatus of claim 1 wherein said receiving means is connected to said target means by electrical wire means.

3. The apparatus of claim 2 wherein said target means is cylindrical or spherical in shape.

4. The apparatus of claim 2 wherein said receiving means comprises signal recording means.

5. The apparatus of claim 2 wherein said receiving means comprises means to provide an immediate read-out of the total count of signals over a predetermined time interval.

6. The apparatus of claim 2 wherein said target is suspended from a vertically-positioned cable.

7. The apparatus of claim 2 wherein said target means comprises a foamed plastic ball having a piezoelectric transducer therein.

8. The apparatus of claim 2 wherein said target means comprises a hollow plastic container having a transducer therein.

9. The apparatus of claim 8 wherein said transducer is selected from the group consisting of a microphone and an inertially loaded resonance transducer.

10. A method for determining the temperament of a bee colony comprising
    a. inducing said colony to strike a transducer-containing target near said colony's habitat, that generates an electrical signal for each individual strike; and
    b. converting each such signal into a form that expresses the total number of strikes for a predetermined period.

11. The method of claim 10 wherein said conversion step comprises recording each of said signals.

12. The method of claim 10 wherein said conversion step comprises providing an immediate read-out of the count of said signals over a predetermined time interval.

13. The method of claim 10 wherein said habitat is a bee hive.

14. The method of claim 10 wherein said habitat is an apiary bee hive.

* * * * *